Patented Sept. 24, 1946

2,408,332

UNITED STATES PATENT OFFICE 2,408,332

WATER-SOLUBLE RESINOUS CONDENSATES

Willard L. Morgan, Columbus, Ohio, assignor to Arnold, Hoffman & Co. Incorporated, a corporation of Rhode Island No Drawing. Application March 6, 1945, Serial No. 581,328

12 Claims. (Cl. 260—2)

This application is a continuation in part of my application Serial No. 508,956 filed November 4, 1943 which is a continuation in part of my application Serial No. 380,816 filed February 27, 1941.

Stable resinous products that are water soluble and at the same time cheap and readily available have considerable uses in the arts as adhesives, binders, plasticizers, as compositions for use in coatings, back-filling and many other types of work in the paper and textile industries.

In the textile industry fabric constructions have in the past been sized by the application of starch, gelatin, and water soluble gum compositions for the purpose of applying coatings which cement down the extraneous fibers on the surface of the yarns or fabric and thereby give a greater smoothness and uniformity of appearance. In the case of warp sizing, it is particularly essential that a good surface film be prepared in order to have acceptable conditions for weaving. Proper binding of the starch is necessary to eliminate fly, breaking of the yarns and subsequent stopping of the looms. In such compositions there is also subsequently used fatty type softeners along with hygroscopic agents which are added to increase the amount of moisture retained in the starch during processing.

In U. S. Patent #1,953,741 to Bennett, July 15, 1932, water soluble resinous products have been made by reaction of glycols or polyhydric alcohols, such as; ethylene glycol, diethylene glycol, etc., by reacting these with boric acid. While such products are water soluble, they have found only limited uses due to their unstability in particular and water solutions soon after preparation become cloudy and turbid due to boric acid rapidly hydrolyzing and splitting out of the compound. The resin rapidly hydrolyzes and is soon completely destroyed, thereby limiting the utility of these products.

I have found that stable water-soluble resins may be prepared which may be kept for a long time in water solution without hydrolysis by reacting boric acid with compounds characterized by containing an amino group. Boric acid is an inorganic acid, and while its formula is generally given as $H_3BO_3$, it is not considered to react as a polybasic acid and upon heating it to relatively low temperatures, it easily gives up one molecule of water and thereafter reacts according to the general formula for metaboric acid ($HBO_2$). Its reaction in aqueous solutions have been frequently shown by physical chemical measurements to indicate the formula $HBO_2$ rather than $H_3BO_3$. The organic esters of boric acid indicate an acid or composition $HBO_2$ rather than $H_3BO_3$. All chemical information indicates that boric acid $H_3BO_3$ is really a hydrate of the acid $HBO_2$, and is to be looked upon as $HBO_2$—$H_2O$.

In carrying out the invention I mix one or more mols of boric acid with an alkyl amino compound, which specifically is either a polyamine or an alkyl aminol amine of the following general formula:

$$RNH-X$$

The mixture is then heated above 100° C. up to a maximum of approximately 200° C. I find in general that temperatures of around 130 to 150° C. are sufficient for the reaction and the heating is carried out until more than one mol of water has been lost. It is apparent that one mole of water will be lost by the dehydration of the boric acid, $H_3BO_3$, down to the metaborate form, $HBO_2$ and any further water molecules lost must represent reaction between the acid and the amino compounds.

In the above general formula for amino compounds, which are satisfactory for use in this invention, X may represent either simple branched alkyl chains or groups containing not over five carbons in which one or more hydroxyl or amino groups appear. X may also stand for alkyl polyamino chains, such as, $$(CH_2)_n-[NH(CH_2)_n]_p-Y$$

in which $n$ and $p$ are small integers, with $n$ varying from 2 to 6 and $p$ from 0 to 6. Y is either hydroxyl (OH) or amino ($NH_2$).

In the general formula R stands for either hydrogen or any group of the type described by X.

Suitable amino compounds for condensation with boric acid to secure water soluble resins are as follows: monoethanolamine, diethanolamine, mono- and diisopropanolamine, ethylene diamine, diethylene triamine, dipropylene triamine, triethylene tetramine, tetraethylene pentamine, heptaethylene octamine, hexapropylene heptamine, hexamethylene diamine, 2-amino-2-ethyl-1,3 propanediol, 2-amino-2-methyl-1-propanol, 2-amino-2-methyl-1,3 propanediol, trimethylol amino methane, 2-amino-2-methyl-1-butanol, 2-amino-1-pentanol and hydroxy ethyl ethylene diamine.

The complex polyamino compounds, such as heptaethylene octamine, hexapropylene heptamine and other similar long chain compounds, may be easily synthesized by reaction of alkyl dihalides and organic amines or other known methods of synthesis. By proper selection of the alkyl di-halides and amino compounds, various structures may be built up to obtain the desired characteristics of the final boric acid condensate.

The detailed practice of the invention is illustrated by the following examples wherein the parts are given by weight:

Example 1.—62 parts of boric acid (1 mol) were mixed with 61 parts (1 mol) of monoethanolamine and gradually heated until water was collected in the sidearm tube. Heating was continued until 155° C. at which point 1¼ mols of water were split out and the residue in the flask cooled down. This yielded a water-soluble, viscous resin which was hard, glassy, practically colorless or slightly yellow, transparent, and non-hygroscopic in nature. The resin is readily soluble in water and from such aqueous solutions the resin can be again secured by drying down, thus indicating that the product is stable and does not hydrolyze. The water solutions can be kept without any apparent evidence of change. The resin is easily softened on heating and is permanently thermoplastic.

A cotton warp wound on a beam in the usual manner was run through a size which was prepared by boiling 50# of potato starch, 7½# of fatty glycerides, 2½# soda ash in 100 gallons of water to which was added 2½# of the above water soluble resin. The yarns when dried showed a smooth hard surface, did not fray during the weaving and permitted operation of the looms at high efficiency.

Example 2.—62 parts of boric acid (1 mol) were mixed with 116 parts (1 mol) of hexamethylene diamine (1,6 hexanediamine) and gradually heated until the water was collected in the sidearm tube. Heating was continued until 140° C. at which point 2 mols of water were split out and the residue in the flask cooled down. This yielded a water-soluble, viscous resin which was hard, slightly yellow, transparent and non-hygroscopic in nature. The resin is readily soluble in water and from such aqueous solutions the resin can be again secured by drying down, thus indicating that the product is stable and does not hydrolyze.

Example 3.—60 parts of ethylene diamine (1 mol) were mixed with 62 parts of boric acid (1 mol) and gradually heated until water was collected in the sidearm tube. Heating was continued until 130° C. at which point 2 mols of water were split out and the residue in the flask cooled down. This yielded a water-soluble, viscous resin which was hard, glassy, practically colorless or slightly yellow, transparent, and non-hygroscopic in nature. The resin is readily soluble in water and from such aqueous solutions the resin can be again secured by drying down, thus indicating that the product is stable and does not hydrolyze. The water solutions can be kept without any apparent evidence of change. The resin is easily softened on heating and is permanently thermoplastic.

Example 4.—104 parts of hydroxy ethyl ethylene diamine (1 mol) were mixed with 62 parts of boric acid (1 mol) and gradually heated until water was collected in the sidearm tube. Heating was continued until 195° C. at which point 1½ mols of water were split out and the residue in the flask cooled down. This yielded a water-soluble, sticky, viscous resin which was slightly yellow, transparent, and non-hygroscopic in nature. The resin is readily soluble in water and from such aqueous solutions the resin can be again secured by drying down, thus indicating that the product is stable and does not hydrolyze. The water solution can be kept without any apparent evidence of change. The resin is easily softened on heating and is permanently thermoplastic.

Rayon yarns when sized in a bath containing a solution of 4% gelatin and 1% of the above resin were satisfactorily sized for weaving operations.

Example 5.—89 parts of 2-amino-2-methyl-1-propanol (1 mol) were mixed with 62 parts of boric acid (1 mol) and gradually heated until water was collected in the sidearm tube. Heating was continued until 130° C. at which point 1½ mols of water were split out and the residue in the flask cooled down. This yielded a water-soluble, amber, viscous resin which was hard, transparent, and slightly hygroscopic in nature. The resin is readily soluble in water and from such aqueous solutions the resin can be again secured by drying down, thus indicating that the product is stable and does not hydrolyze. The water solutions can be kept without any apparent evidence of change. The resin is easily softened by heating and is permanently thermoplastic.

In sizing threads and twines, a composition prepared by boiling in 100 gallons of water, 50# of tapioca dextrin, 10# of talc and 10# of the above resin gave a hard smooth surface, but flexible, which characteristic is desired for sewing threads, twines, etc.

Example 6.—318 parts of heptaethylene octamine (1 mol) were mixed with 62 parts of boric acid (1 mol) and heated to 135–140° C., at which point 2 mols of water were split out and the residue in the flask cooled down. This yielded a water-soluble, yellow, viscous resin, transparent and hygroscopic in nature. The resin is readily soluble in water and such aqueous solutions can be kept without any evidence of hydolysis after long periods of time.

Example 7.—To 485 parts (1 mol) of a polyalkyl amino condensate having the following formula:

were added 62 parts (1 mol) of boric acid. Heat was applied until 140° C. was reached, at which point 2 mols of water were split out and the boric acid condensate in the flask cooled down. The resinous product obtained was easily water-soluble, yellow, transparent and slightly hygroscopic in nature.

Example 8.—To 131 parts (1 mol) of dipropylene triamine were added 62 parts of boric acid (1 mol) and the temperature gradually raised until the water was collected in the sidearm tube. Heating was continued until 140° C. was reached, at which point 2 mols of water were split out and the residue in the flask cooled down. This yielded a water-soluble, viscous resin which was hard, slightly yellow, transparent and non-hygroscopic in nature. The resinous compound is easily softened upon heating and does not hydrolyze in water solutions.

Cotton cloth to be finished for white sheeting was back-sized by running the fabric through a quetch, squeeze roll and drying machine with a formula prepared by boiling in 100 gallons of water, 130# of corn starch, 225# talc, 50# of saponified tallow and 20# of the above water soluble resin. The sheeting was satisfactorily back-sized and the starch well bound in the fabric.

Example 9.—88 parts of butylene diamine (1 mol) were mixed with 62 parts of boric acid (1 mol) and gradually heated until water was collected in the sidearm tube. Heating was continued until 135° C. at which point 2 mols of water were split out and the residue in the flask cooled down. The condensate obtained was a water-soluble, viscous resin, transparent and non-hygroscopic in nature.

*Example 10.*—To 62 parts of boric acid (1 mol) were added 102 parts (1 mol) of amylene diamine and the temperature gradually raised until the water was collected in the sidearm tube. Heating was continued until 140° C. at which point 2 mols of water were split out and the residue in the flask cooled down. This yielded a water soluble, hard, transparent resin which is soluble in water and undergoes no hydrolysis on long standing.

In the sizing of knitted shoe laces it is necessary to secure a smooth surface which will take a high polish. This effect was satisfactorily secured by sizing shoe laces in a bath of the following composition. In 50 gallons of water were boiled 10# of wheat starch, 10# of potato starch, 10# of corn starch, 3# Japan wax, 1½# of cocoanut oil and 10# of the above water soluble resin. The shoe laces thus sized possessed a smooth surface which on rubbing gave a high lustre.

The above examples are given only by way of illustration and the use of various other amines result in various other type resinous products. In view of the fact that water may be split out by reaction of boric acid with either an amine or hydroxyl group, it is to be presumed that the resinous products are formed in this manner. It is apparent that high polymeric chain resins formed must have rather complex chemical formulas and it is not my intention in offering these suggested reactions as the source of the water eliminated that this is necessarily the only type of combination which occurs, and this application is not to be limited in terms of this type of interpretation.

The above description and examples are intended to illustrate the nature of this invention but the invention is not restricted to these examples.

I claim:

1. The process for the manufacture of water soluble resins which consists of condensing boric acid and an amino compound of the following general formula:

$$RNH-(CH_2)_n-[NH(CH_2)_n]_p-Y$$

in which $n$ and $p$ are small integers, with $n$ varying from 2 to 6 and $p$ from 0 to 6, and Y is a radical selected from the group consisting of a hydroxyl (OH) and an amino ($NH_2$), and in which formula R represents a radical selected from the group consisting of hydrogen and

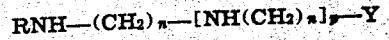

in which $n$ and $p$ are small integers, with $n$ varying from 2 to 6 and $p$ from 0 to 6, and Y is a radical selected from the group consisting of a hydroxyl (OH) and an amino ($NH_2$).

2. A water soluble resinous condensation product of reactants consisting of boric acid and an amino compound of the following general formula:

$$RNH-(CH_2)_n-[NH(CH_2)_n]_p-Y$$

in which $n$ and $p$ are small integers, with $n$ varying from 2 to 6 and $p$ from 0 to 6, and Y is a radical selected from the group consisting of a hydroxyl (OH) and an amino ($NH_2$), and in which formula R represents a radical selected from the group consisting of hydrogen and

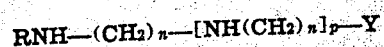

in which $n$ and $p$ are small integers, with $n$ varying from 2 to 6 and $p$ from 0 to 6, and Y is a radical selected from the group consisting of a hydroxyl (OH) and an amino ($NH_2$).

3. The process for forming a water soluble resin which consists of condensing boric acid and monoethanolamine at temperatures above 100° C.

4. A water soluble resinous condensate of reactants consisting of boric acid and monoethanolamine condensed by heating at temperatures above 100° C.

5. The process for forming a water soluble resin which consists of condensing boric acid and ethylenediamine at temperatures above 100° C.

6. The process for forming a water soluble resin which consists of condensing boric acid and 2-amino-2-methyl-1-propanol at temperatures above 100° C.

7. A water soluble resinous condensate of reactants consisting of boric acid and ethylenediamine condensed by heating at temperatures above 100° C.

8. A water soluble resinous condensate of reactants consisting of boric acid and 2-amino-2-methyl-1-propanol.

9. Textile materials sized with a composition in which the binder consists of a water soluble resinous condensate of boric acid and an amino compound of the following general formula:

$$RNH-(CH_2)_n-[NH(CH_2)_n]_p-Y$$

in which $n$ and $p$ are small integers, with $n$ varying from 2 to 6 and $p$ from 0 to 6, and Y is a radical selected from the group consisting of a hydroxyl (OH) and an amino ($NH_2$), and in which formula R represents a radical selected from the group consisting of hydrogen and

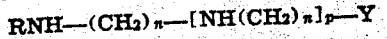

in which $n$ and $p$ are small integers, with $n$ varying from 2 to 6 and $p$ from 0 to 6, and Y is a radical selected from the group consisting of a hydroxyl (OH) and an amino ($NH_2$).

10. Textile material sized with a composition in which the binder consists of a water soluble resin secured by the reaction of boric acid and monoethanolamine.

11. Textile material sized with a composition in which the binder consists of a water soluble resin secured by the reaction of boric acid and ethylene diamine.

12. Textile material sized with a composition in which the binder consists of a water soluble resin secured by the reaction of boric acid and 2-amino-2-methyl-1-propanol.

WILLARD L. MORGAN.